May 17, 1949.　　　　　D. E. SHARP　　　　　2,470,526
APPARATUS FOR DRAWING SHEET GLASS

Filed Dec. 6, 1944　　　　　　　　　　　3 Sheets-Sheet 1

Inventor
DONALD E. SHARP

Frank Fraser
Attorney

May 17, 1949.                D. E. SHARP                2,470,526
                     APPARATUS FOR DRAWING SHEET GLASS
Filed Dec. 6, 1944                                3 Sheets-Sheet 2

Inventor
DONALD E. SHARP.
By
Frank Fraser
           Attorney

May 17, 1949.　　　　D. E. SHARP　　　　2,470,526
APPARATUS FOR DRAWING SHEET GLASS
Filed Dec. 6, 1944　　　　　　　　　　　　　3 Sheets-Sheet 3

INVENTOR.
DONALD E. SHARP
BY Nobbe and Shope
ATTORNEYS

Patented May 17, 1949

2,470,526

UNITED STATES PATENT OFFICE 2,470,526

APPARATUS FOR DRAWING SHEET GLASS

Donald E. Sharp, Toledo, Ohio, assignor to Libbey-Owens-Ford Glass Company, Toledo, Ohio, a corporation of Ohio Application December 6, 1944, Serial No. 566,857

9 Claims. (Cl. 49—17)

The present invention relates to apparatus for producing sheet glass, and particularly flat glass whose surfaces have a natural fire finish. Such flat glass is generally referred to in the trade as "sheet" glass or "window" glass, distinguishing it from plate glass whose surfaces are mechanically ground and polished. Throughout this application and in the claims, the expression "sheet glass" will be used in this sense.

The various machines employed today in the production of sheet glass all have the common characteristics that the sheet is drawn in flat form continuously from a bath supplied by a tank furnace. The glass-making ingredients are introduced into the tank furnace, and are then progressively melted, refined and conditioned for proper withdrawal in sheet form from the working end. The thickness of the sheet drawn is controlled by balancing the rate of withdrawal of the sheet from its source with the working temperature of the molten glass itself.

Technological developments in glass batches, ceramics, glass forming machinery and techniques, have made it possible to prepare in a single tank large tonnages of glass suitable for drawing into a sheet of considerable width. The present invention is concerned primarily with the control of conditions in the area or zone of sheet formation. Assuming the molten glass is properly prepared and conditioned, that is, the batch ingredients have been melted and refined to give a metal quality substantially devoid of inherent metal defects, there is the further problem of converting the molten glass to sheet form having a thickness which is adequately uniform from edge to edge, and the surfaces of which are relatively free from imperfections.

The condition of the atmosphere surrounding the sheet during its period of formation has a substantial influence on its uniformity of thickness and surfaces. The temperature of the atmosphere above the mass of molten glass from which the sheet is withdrawn is relatively high but is not uniform across the sheet or its base. Even in those cases where the good practice of enclosing the machine is followed, there is a considerable infiltration of outside, relatively cold air. Generally speaking, this air is drawn in from the edges of the sheet, passing upwardly toward the center, rising continually as it heats up and expands. These movements of air and convection currents result in uncontrolled turbulence, contributing heavily to air temperatures which are not uniform throughout or constant, in consequence of which the glass in its zone of sheet formation is subjected to different temperature conditions, causing thick and thin streaks in the glass sheet itself. In areas where cold air strikes the unset glass, it will chill or set more rapidly, and thus be thicker in the finished sheet, than adjacent areas exposed to greater temperatures so that the sheet will continue to attenuate and become relatively thinner before setting. Outside air gaining entrance at this point may also introduce dirt and other foreign matter which may embed itself in the glass causing permanent defects, or may lodge upon rolls with which the sheet comes in contact causing scratching, digs, etc.

I have devised means for establishing predetermined and controlled air conditions in the zone of sheet formation. Basically, objectionable and uncontrolled movements of air of varying temperatures are prevented or offset by positively creating movements of air from approximately the center of the sheet toward both sides thereof. The air used or moved from the center of the sheet toward its sides is intended to be that air already present above the glass or, stated differently, the air contained within the apparatus. The expression "air" is used in broad sense, including air, gases, products of combustion, etc. The volume and velocity of the air currents are controlled to offset or overbalance the tendency of infiltration of outside cold air and also to cause a definite movement of warm air from the heart of the sheet toward the normally cooler edges, which movement is counter to the normal tendency of the air to move from the colder edges of the sheet toward its center.

Thus, the main object of the invention is to advance the technique of drawing sheet glass toward the end of producing a sheet having improved thickness and surface condition characteristics.

In the drawings wherein like numerals are employed to designate like parts throughout the same:

Figure 4:
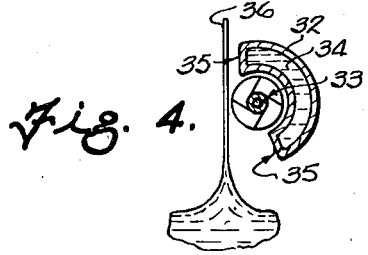
Fig. 4 is a detail illustrating a water-cooled shield or baffle used in conjunction with an air impeller.
Figure 5:
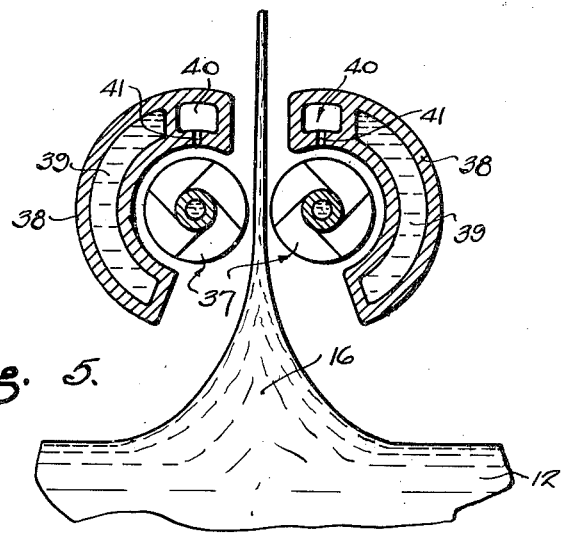
Fig. 5 is an enlarged detailed view indicating a modification of the air impeller and shield arrangement.
Figure 6:
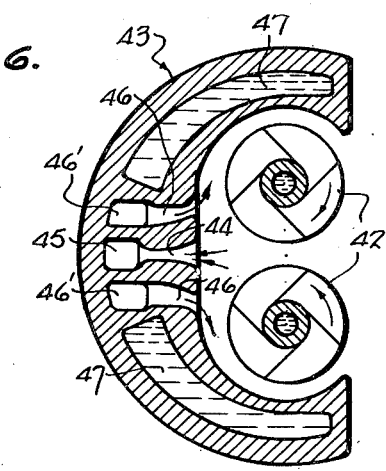
Fig. 6 is a sectional detail of a modification wherein two air impellers are associated with a single shield or baffle.
Figure 7:
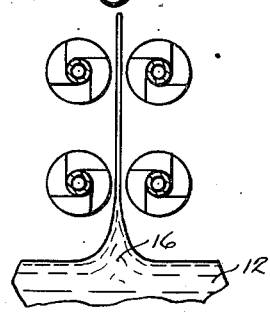
Figure 9:
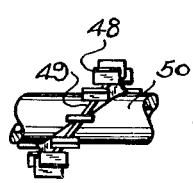
Figure 8:
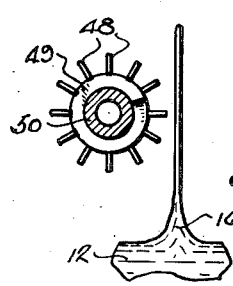
Figure 10:
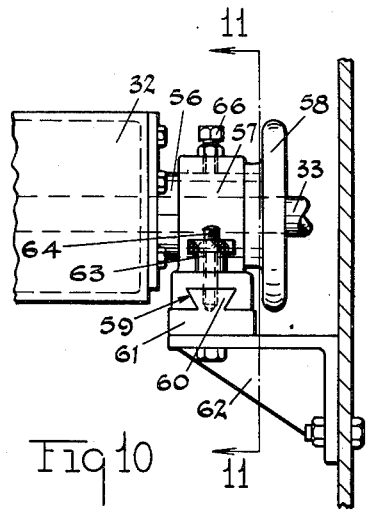
Figure 11:
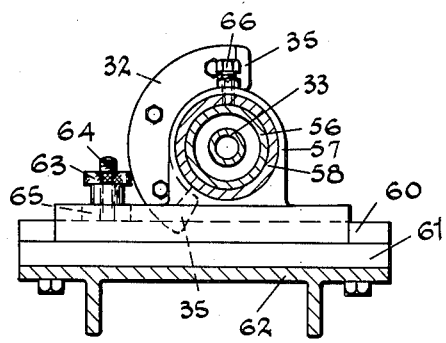
Figure 12:
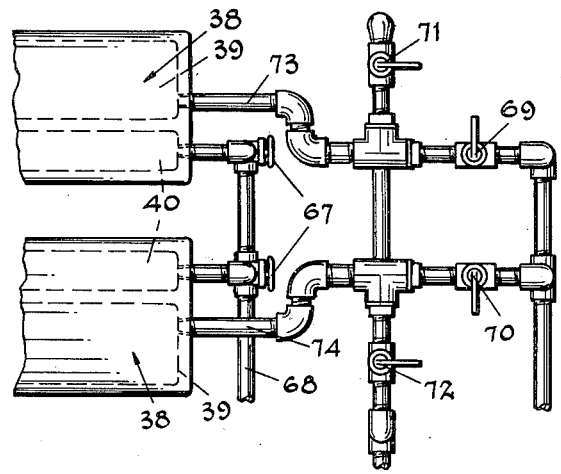
Figure 13:
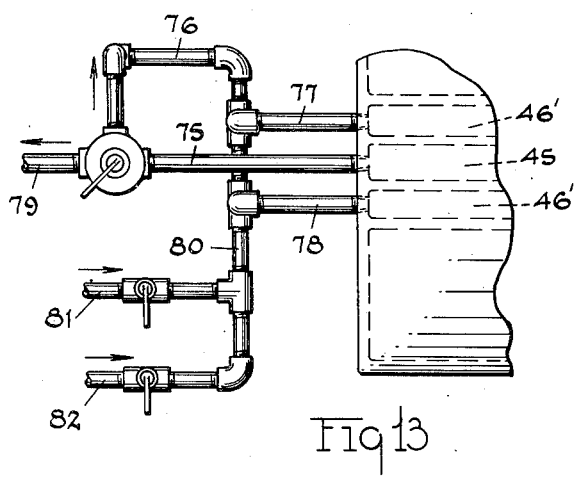

Fig. 7 diagrammatically shows a pair of individual air flow devices on both sides of the sheet;

Fig. 8 is a detail of a paddle wheel type of air impeller;

Fig. 9 is a fragmentary elevation of the impeller shown in Fig. 8;

Fig. 10 is a fragmentary side view of one end of the water cooled shield or baffle of Fig. 4, showing the mounting and adjusting means therefor;

Fig. 11 is a view taken substantially on the line 11—11 in Fig. 10;

Fig. 12 is a fragmentary plan view of one end of the curved shields of Fig. 5, showing the temperature regulating controls therefor; and Fig. 13 is a fragmentary side view of the shield of Fig. 6, showing the air conduits leading to and from the air passages therein.

My general type of apparatus can be used in conjunction with any of the well known sheet glass forming machines. The particular machine illustrated in the drawings is known as the Colburn type, and it will be appreciated that the same principles are involved for controlling the air in the area of sheet formation of the other types of machines.

Figure 1:
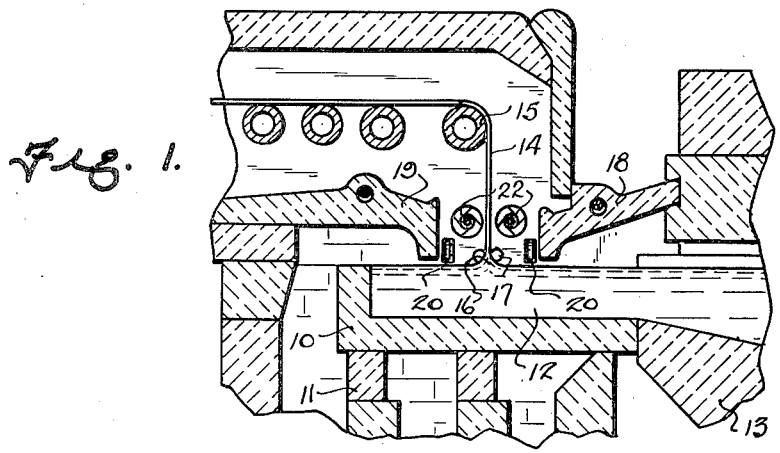
Fig. 1 is a fragmentary vertical longitudinal section illustrating diagrammatically one type of sheet glass drawing machine.

In Fig. 1 the numeral 10 designates the working end of a continuous tank furnace, the receptacle at this end of the furnace in the Colburn machine usually being called a drawpot. It is supported on stools 11 so arranged that the pot can be heated by gas burners (not shown) and contains a mass of molten glass 12 furnished continuously from the tank designated generally by the numeral 13.

A continuously drawn sheet 14 is pulled vertically from the mass of glass 12. The Colburn apparatus is distinguished in part by the fact that while the glass is drawn initially in a vertical plane, it is passed over an internally cooled bending roller 15 so that the sheet may then be carried horizontally through flattening and annealing chambers. The sheet or ribbon 14 in this instance is not cut into individual sheets until after it leaves the annealing leer.

In other types of sheet glass machines, the sheet is carried through vertically disposed leers, and in still another form the sheet is carried upwardly a substantially greater distance than in the Colburn machine, then cut and transferred as individual sheets to a horizontally disposed leer.

When drawing the glass from the drawpot of a Colburn machine, a meniscus or enlarged base portion 16 is created, as is clearly illustrated in Fig. 5, and the final sheet thickness is reached some distance above the surface of the bath. To hold the sheet to width, driven, internally cooled knurled edge devices 17 (Figs. 1 and 2) are mounted to operate in the border portions of the meniscus and have a peripheral speed which is somewhat less than that of the bending roller 15 and consequently the sheet itself. Likewise, the standard Colburn machine includes the liptiles 18 and 19 and liptile coolers 20, positioned to protect the rising sheet 14 from excessive blasts of heated air and gases from the furnace and from the pot chamber. The coolers also serve to reduce the temperature of the surface of the glass moving thereunder just before it is pulled into the sheet. All things being equal, the faster the machine is operated, the thinner will be the sheet; and vice-versa, to obtain thicker sheets, the machine is operated at the slower speeds. The speed of draw coupled with the viscosity of the glass determines the average thickness of sheet drawn.

That area disposed generally between the liptile coolers and the bending roll 15 is referred to herein as the zone of sheet formation. Within this zone is the exposed surface of the glass in the drawpot, the meniscus, and the rising sheet. The distance between the bending roll and the surface of the molten glass is such that the sheet may be brought into contact with the bending roller without marring its surface, provided of course the surface of the roll and the sheet in contact therewith are reasonably free from grit-like foreign matter.

Figure 2:
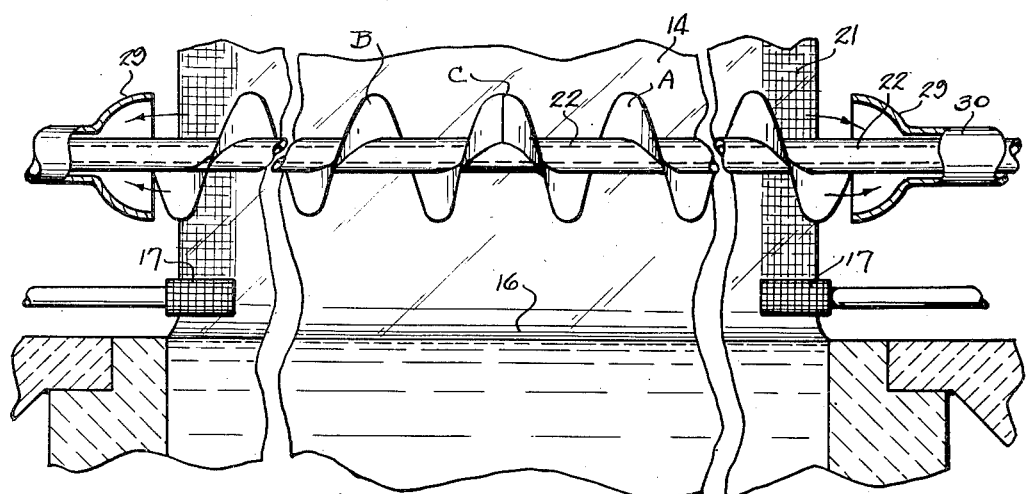
Fig. 2 is a transverse vertical section of the same type of machine showing the simplest form of my air flow control device.

The knurled width maintaining rollers 17 chill the glass passing therebetween and produce the impressions indicated generally by the numeral 21 in Fig. 2, but this part of the sheet is removed at the exit end of the leer.

There is normally a stack effect through the sheet forming zone, with the predominantly hotter gases rising centrally of the sheet, and this condition is aggravated when outside air is permitted to flow in from the edges of the sheet and move toward its center. These varying temperature conditions, convection currents and other uncontrolled movements of air have an effect upon the sheet during its formative period. Infiltration of outside air, which is bound to occur even when machine enclosures are used, accentuates the non-uniform character of the air conditions present within the machine, and experience has shown that these air movements, producing temperature differentials across the width of the sheet, result in a sheet having non-uniform thickness characteristics. As an additive, these uncontrolled air disturbances, particularly when laden with dirt, have an adverse effect on the surface conditions of the sheet.

I have determined that it is beneficial to create positive and controlled movements of air and to propel them continuously from the center of the sheet toward both sides thereof. By preference, the air caused to move in accordance with this principle is that air already contained within the apparatus, and if any supplementary air is used that it be conditioned as to temperature and to remove foreign matter which could injure the surfaces of the sheet.

Figure 3:
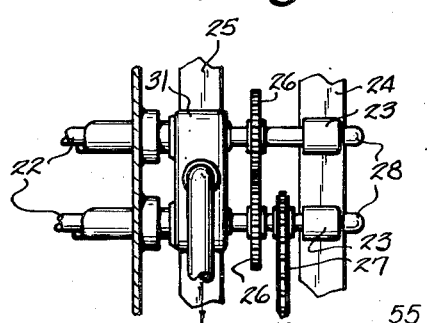
Fig. 3 is a fragmentary plan view of a form of drive mechanism for a pair of the air flow control devices and supporting means therefor.

In Fig. 2 is shown a simple device which can be used to create the desired air movements. A shaft 22, having a bore through which a temperature controlling medium may be circulated, is adapted to be mounted transversely of the drawpot and generally parallel with the sheet 14. Two spirally wound blades are carried by the shaft. In Fig. 2 one blade or fin is indicated by the letter A and the other by the letter B. They produce, in effect, a double air screw having right and left hand portions meeting at C approximately midway of the glass sheet. In Fig. 3 is illustrated means for mounting, rotating and cooling a pair of such air screw devices, one on each side of the sheet. Shafts 22 extend through suitable journals or bearings 23 mounted on the supports 24 and 25, and each carries a gear 26, both of which mesh and are driven by the means 27 causing the rolls to rotate toward or away from one another, depending upon the direction of the drive 27. The elbows 28 indicate connections to a cooling medium supply, such as water, provided for passage through the shafts to prevent their overheating. The effectiveness of the shaft as a cooler for the atmosphere and the glass sheet will be dependent upon the size of the pipe, the rate of flow of the coolant and the proximity of its location with respect to the sheet.

Upon rotation of the shafts, the screw blades will induce a flow of air which is carried from the center of the sheet toward its sides, and it is intended that a variable speed drive, such as the variable speed motor with built-in speed reducer shown at 55, be provided so that the movement of air can be readily controlled as to velocity. Preferably, the air leaving the ends of the screw blades is positively withdrawn and carried away from the machine, as for example, by exhausting into bell-shaped chambers 29 surrounding the screw shaft and spaced therefrom. In other words, the internal bore of the tube 30 has a diameter greater than the outside diameter of the screw impeller shaft 22. This provides an exhausting passageway between the two, and positive withdrawing means can be arranged for by connecting the tube 30 to an exhausting manifold 31 and pump (not shown).

In Fig. 4 is shown a slight modification in which a curved housing 32 is associated with the rotary air propeller 33 which may be similar to the air screw device shown in Fig. 2. The housing or shield 32 is formed from any suitable non-corrosive metal and has an internal chamber through which a cooling fluid 34 may be circulated. The cooler member is adjustably mounted by means so that it can be positioned with relation to the rotary air propeller and, likewise, so the distance between the ends 35 thereof and the sheet 36 can be varied. Suitable mounting and adjusting means for this purpose are illustrated in Fig. 10 and 11. As shown there, the shield 32 is provided with a hollow, supporting, stub shaft 56 at either end thereof, which stub shafts are rotatably mounted in bearings 57 and are provided with hand wheels 58 keyed thereto. The bearings 57 may be formed with dove-tail slots 59 in their bottoms which are slidably received on similarly shaped projections 60 on the top surface of blocks 61 carried on brackets 62 which may be bolted to the machine enclosure wall. With this construction, the hollow stub shafts 56 surround and are normally in axial alignment with the shaft of the rotary air impeller 33. However, by loosening the knurled head 63 on the bolt 64 the bearing 57 may be slid back and forth on the block 61 to adjust the cooler member 32 with relation to the air propeller, within the limits of the slot 65. In order to vary the distance between the ends 35 of the shield and the glass sheet being drawn, it is only necessary to loosen the adjusting screw 66 in the bearing 57 and to then rotate the shield by means of the hand wheel 58.

In Fig. 4 only one rotary air device is shown, and in some cases a device on one side of the sheet only may be adequate, but I prefer to provide at least one on each side of the sheet for flexibility in insuring proper and adequate control of the atmosphere surrounding the sheet during its period of formation.

In Fig. 5 a pair of rotary air control members 37 is provided and each has a housing 38 differing in construction from the shield 32 in Fig. 4. Each cooler 38 has a compartment through which a cooling medium 39 is passed, and an air chamber 40 from which air may be discharged through openings or a continuous slot 41 to be picked up by the air screw 37 and moved into contact with the glass sheet.

As previously mentioned, I normally prefer to use that air contained within the machine, but supplementary air can be introduced, for example, through the shield 38, and it is advantageous to condition the air as to temperature and freedom from foreign matter before it is discharged into the zone of sheet formation. Obviously, the temperature and pressure of the air discharging through the openings 41 can be adjusted to give the desired delicate temperature control when such air is mixed and blended with the other air by the air screws 37. The curved shields 38 are provided with independent temperature regulating controls, such as valves 67 in the air line 68, and valves 69, 70, 71 and 72 in the water lines 73 and 74 (Fig. 12), as frequently the extent of cooling and amount of air required will not be identical on both sides of the sheet.

For greater flexibility, two or more air flow inducing devices may be used on each side of the sheet, and two arrangements of this character are illustrated in Figs. 6 and 7. In Fig. 6 a pair of air propelling devices 42 is associated with a single shield 43. Preferably, in operation of this unit, the members 42 are rotated in the direction of the arrows which induces a flow of air into the openings or slot 44 of the shield communicating with the passageway 45. All of this air can be returned to the zone of sheet formation, through conduits 75, 76, 77, 78 and the openings or slots 46, or may be partially or completely exhausted exteriorly of the machine through conduit 79 and cooler air brought in through conduits 80, 77, 78 and the channels 46′ and fed through the orifices 46. As shown in Fig. 13, conduits 75, 76 and 79 terminate in a booster air pump and associated three-way valve, which facilitate movement of air through the conduits in the desired direction. The flows of air into and out of the housing 43 are indicated by the arrows. The shields 43 are internally cooled by the medium 47. In addition to the air forced into the shield cavity 45 by the screw devices 42, supplementary air at any desired temperature can be added by way of conduits 81 and 82 which, together with the action of the coolant 47, affords great flexibility in the control of the air in the zone of sheet formation as to quantities, movements and temperatures.

The air propellers arranged on both sides of the sheet in Fig. 7 are indicated as spaced farther apart from one another than the rolls 42 just described and without the shields or baffles, but they can of course be used.

Still another modification is indicated in Figs. 8 and 9 wherein a plurality of spaced vanes 48 are carried by the periphery of the spiral fan blade 49 mounted on the internally cooled shaft 50. Preferably, all of the vanes 48 are arranged so that they are parallel with the shaft of the impeller and to give maximum positive feeding of the air from the center of the sheet toward its edges, and further to produce what may be termed a paddle wheel action which drives the air against the sheet surface.

In a broad sense, the various forms of air control devices may be referred to as rotary coolers, but it will be understoood that I do not wish to imply that in all instances the members are controlled to materially reduce the temperature of the air. Some cooling of the shafts is required to prevent overheating of the metal parts, and I consider it good practice to design and operate the devices in such a way that they will not sag or warp due to overheating. On the other hand, the air screws having internally cooled supporting shafts, can be operated at such speeds as to move a sufficient volume of air that the temperature of the air is not measurably reduced.

Clearly, positive cooling action is also contemplated, and the cooled housings, when associated with the air screws, are in part for the purpose of lending control to the air movements and to reduce to the desired extent the temperature of the air before it is forced into contact with the sheet. In addition to treatment of the contained air, supplementary air of any desired temperature can be blended with the heated air to give the necessary control required for quality glass production.

It is fundamental with my invention that air is positively and continuously moved from the center of the rising sheet toward its edges, which is counter to the normal flow of air in the zone of sheet formation when my rotary air impellers are not in use. The pitch and size of the spiral blades can be varied from that shown. Further, the air screws are so mounted that they can be taken out and replaced with different sized units as required.

In ordinary usage, and particularly with the Colburn sheet glass machine, the rotary air propellers are operated to move continuous blankets of air in a direction generally downward with respect to the rising sheet, and from the center toward the sides thereof. However, the direction of either one or both can be reversed to move the blanket of air upwardly. Although these positive means create a movement of air, undesirable turbulence and uncontrolled movements are avoided. Temperature conditions affecting the sheet during its period of formation are controlled to avoid spotty and irregular cooling of the glass and consequently cold streaks and hot streaks which, if permitted, give a finished sheet having variations in thickness resulting in an appearance of waviness.

As previously mentioned, the rate at which any given thickness of sheet can be pulled from the molten glass bath is dependent upon the viscosity of the glass. An important feature of my invention is that the glass can be cooled faster than normal, in the zone of sheet formation, and uniformly so, resulting in an accelerated speed of sheet drawing. Production can be further increased by drawing wider sheets, made possible because the rotary air propellers and temperature controlling means will give the needed conditioning treatment to the glass for uniformity of thickness and acceptable surface characteristics.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for producing sheet glass comprising a receptacle adapted to be continuously supplied with a pool of molten glass, means for drawing a sheet upwardly from said pool, and rotary air flow devices positioned transversely of the sheet in its zone of formation, said devices being positively driven and having pitched blades for inducing a flow of air laterally of the sheet in both directions from the center thereof toward both edges.

2. Apparatus for producing sheet glass comprising a receptacle adapted to be continuously supplied with a pool of molten glass, means for drawing a sheet upwardly from said pool, rotary air flow devices positioned transversely of the sheet in its zone of formation, said devices being positively driven and having means for inducing a flow of air laterally of the sheet in both directions from the center thereof toward both edges, and means located in alignment with said devices near the edges of the sheet for exhausting the air therefrom.

3. Apparatus for producing sheet glass comprising a receptacle adapted to be continuously supplied with a pool of molten glass, means for drawing a sheet upwardly from said pool, rotary air flow devices positioned transversely of the sheet in its zone of formation, said devices being positively driven and having means for inducing a flow of air laterally of the sheet in both directions from the center thereof toward both edges, and an internally cooled housing means partially surrounding said rotary devices.

4. Apparatus for producing sheet glass comprising a receptacle adapted to be continuously supplied with a pool of molten glass, means for drawing a sheet upwardly from said pool, a pair of rotary air feed devices mounted above said pool and one positioned on each side of the sheet adjacent thereto, each device having a right and left feeding section meeting approximately at the center of the sheet, and means for rotating said devices at a speed sufficient to positively move air from the sheet center toward both sides thereof.

5. Apparatus for producing sheet glass comprising a receptacle adapted to be continuously supplied with a pool of molten glass, means for drawing a sheet upwardly from said pool, a pair of rotary air feed devices mounted above said pool and one positioned on each side of the sheet adjacent thereto, each device having a right and left feeding section meeting approximately at the center of the sheet, means for rotating said devices at a speed sufficient to positively move air from the sheet center toward both sides thereof, and water-cooled members associated with each of the rotary devices for reducing the temperature of the air moved thereby.

6. Apparatus for producing sheet glass comprising a receptacle adapted to be continuously supplied with a pool of molten glass, means for drawing a sheet upwardly from said pool, a pair of rotary air feed devices mounted above said pool and one positioned on each side of the sheet adjacent thereto, each device having a right and left feeding section meeting approximately at the center of the sheet, means for rotating said devices at a speed sufficient to positively move air from the sheet center toward both sides thereof, and water-cooled members associated with each of the rotary devices for reducing the temperature of the air moved thereby, the water-cooled members having air passages and outlets through which air is fed to the rotary devices.

7. Apparatus for producing sheet glass comprising a receptacle adapted to be continuously supplied with a pool of molten glass, means for drawing a sheet upwardly from said pool, a pair of rotary air feed devices mounted above said pool and one positioned on each side of the sheet adjacent thereto, each device having a right and left feeding section meeting approximately at the center of the sheet, means for rotating said devices at a speed sufficient to positively move air from the sheet center toward both sides thereof, water-cooled members associated with each of the rotary devices for reducing the temperature of the air moved thereby, the water-cooled members having air passages and outlets through which air is fed to the rotary devices, and means for exhausting the air from the ends of said rotary devices.

8. Apparatus for producing sheet glass comprising a receptacle adapted to be continuously supplied with a pool of molten glass, means for drawing a sheet upwardly from said pool, a rotary air flow device positioned transversely of the sheet in its zone of sheet formation, said device being positively driven and having pitched blades for inducing a flow of air laterally of the sheet in both directions from the center thereof toward both edges, and a cooling member partially surrounding said rotary air flow device.

9. Apparatus for producing sheet glass comprising a receptacle adapted to be continuously supplied with a pool of molten glass, means for drawing a sheet upwardly from said pool, and a rotary air flow device positioned transversely of the sheet in its zone of sheet formation, said device comprising a shaft, a pitched blade on said shaft, vanes carried by said blade and in angular relation thereto, and means for driving said shaft.

DONALD E. SHARP.

REFERENCES CITED

The following references are of record in the file of this patent:

UNITED STATES PATENTS

| Number | Name | Date |
|---|---|---|
| 1,320,091 | Proeger | Oct. 28, 1919 |
| 2,158,669 | Amsler | May 16, 1939 |
| 2,287,136 | Rolland et al. | June 23, 1942 |
| 2,352,539 | Halbach et al. | June 27, 1944 |